United States Patent
Fang et al.

(10) Patent No.: US 11,917,482 B2
(45) Date of Patent: Feb. 27, 2024

(54) SYSTEM AND METHOD FOR PROXIMITY-BASED SESSION HANDOVER

(71) Applicant: Zoom Video Communications, Inc., San Jose, CA (US)

(72) Inventors: Jin Fang, Saratoga, CA (US); Wei Guo, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 306 days.

(21) Appl. No.: 17/238,907

(22) Filed: Apr. 23, 2021

(65) Prior Publication Data

US 2022/0345971 A1    Oct. 27, 2022

(51) Int. Cl.
*H04W 36/32* (2009.01)
*H04B 11/00* (2006.01)
*H04W 36/00* (2009.01)

(52) U.S. Cl.
CPC ............ *H04W 36/32* (2013.01); *H04B 11/00* (2013.01); *H04W 36/0016* (2013.01)

(58) Field of Classification Search
CPC . H04W 36/32; H04W 36/0016; H04W 8/005; H04W 88/06; H04B 11/00; H04L 67/02; H04L 67/04; H04L 67/1029; H04L 67/148; H04L 67/2895; H04L 67/14
USPC ......................................................... 455/437
See application file for complete search history.

(56) References Cited

U.S. PATENT DOCUMENTS

| | | | |
|---|---|---|---|
| 6,195,545 B1 | 2/2001 | Baker et al. | |
| 8,208,913 B2 | 6/2012 | Allen et al. | |
| 8,326,276 B2 | 12/2012 | Chin et al. | |
| 8,934,869 B2 | 1/2015 | Edara et al. | |
| 9,125,144 B1 | 9/2015 | Orbach et al. | |
| 9,172,813 B2 | 10/2015 | Kannan K | |
| 9,571,974 B2 | 2/2017 | Choi et al. | |
| 10,440,091 B2 | 10/2019 | Ban et al. | |
| 11,165,789 B1* | 11/2021 | Smith | H04L 67/1021 |
| 2011/0167460 A1 | 7/2011 | Tranchina | |
| 2014/0173036 A1* | 6/2014 | Das | G06F 3/0484 |
| | | | 709/219 |
| 2014/0279889 A1 | 9/2014 | Luna | |
| 2014/0354441 A1* | 12/2014 | Luna | H04L 41/0803 |
| | | | 340/686.6 |

(Continued)

OTHER PUBLICATIONS

International Search Report and Written Opinion dated Jul. 7, 2022 in corresponding PCT Application No. PCT/US2022/024738.

*Primary Examiner* — Hirdepal Singh

(74) *Attorney, Agent, or Firm* — Young Basile Hanlon & MacFarlane, P.C.

(57) ABSTRACT

Sessions in progress are seamlessly moved between devices of a software platform. Proximity-based session handovers are performed between devices of the software platform utilizing non-penetrating signals. The non-penetrating signals are detected by mobile devices. The non-penetrating signals include a frequency signature. The frequency signature is associated with a stationary device. A request to handover a session in progress from the mobile device to the stationary device is transmitted based on the detection of a non-penetrating signal. A handover of the session in progress from the mobile device to the stationary device is performed such that the session in progress is continued at the stationary device without interruption.

20 Claims, 10 Drawing Sheets

(56) References Cited

U.S. PATENT DOCUMENTS

| | | |
|---|---|---|
| 2015/0256795 A1 | 9/2015 | Chauhan |
| 2016/0066254 A1 | 3/2016 | Colby et al. |
| 2016/0248779 A1 | 8/2016 | Pappo et al. |
| 2017/0208632 A1* | 7/2017 | Gunasekara .......... H04W 76/10 |
| 2018/0176270 A1* | 6/2018 | Griffin .................... H04L 67/52 |
| 2020/0120401 A1 | 4/2020 | van Scheltinga et al. |
| 2020/0204963 A1 | 6/2020 | Park et al. |
| 2021/0152986 A1* | 5/2021 | Chen ................... H04L 65/1104 |
| 2022/0256001 A1* | 8/2022 | Inamdar ............. H04L 65/1043 |

* cited by examiner

SYSTEM AND METHOD FOR PROXIMITY-BASED SESSION HANDOVER

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for performing proximity-based session handover.

One aspect of this disclosure is a method that includes detecting an ultrasonic signal. The ultrasonic signal may be detected at a mobile device. The ultrasonic signal may include a frequency signature. The frequency signature may be associated with a stationary device. The method includes transmitting a request to handover a session in progress from the mobile device to the stationary device. The method includes performing a handover of the session in progress to the stationary device. The method includes continuing the session in progress at the stationary device. The method includes terminating the session in progress at the mobile device.

Another aspect of this disclosure is a system that includes a stationary device, a mobile device, and a web server. The stationary device may be configured to transmit a non-penetrating signal. The mobile device may be configured to detect the non-penetrating signal. The non-penetrating signal may include a frequency signature. The frequency signature may be associated with the stationary device. The mobile device may be configured to transmit a request to handover a session in progress to the stationary device. The mobile device may be configured to perform a handover of the session in progress to the stationary device. The stationary device may be configured to continue the session in progress.

Another aspect of this disclosure is a mobile device that includes a component, a transmitter, and a processor. The component may be configured to detect an ultrasonic signal. The ultrasonic signal may include a frequency signature of a stationary device. The transmitter may be configured to transmit a request to handover a session in progress from the mobile device to the stationary device. The processor may be configured to perform a handover of the session in progress to the stationary device to continue the session in progress at the stationary device. The processor may be configured to terminate the session in progress at the mobile device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
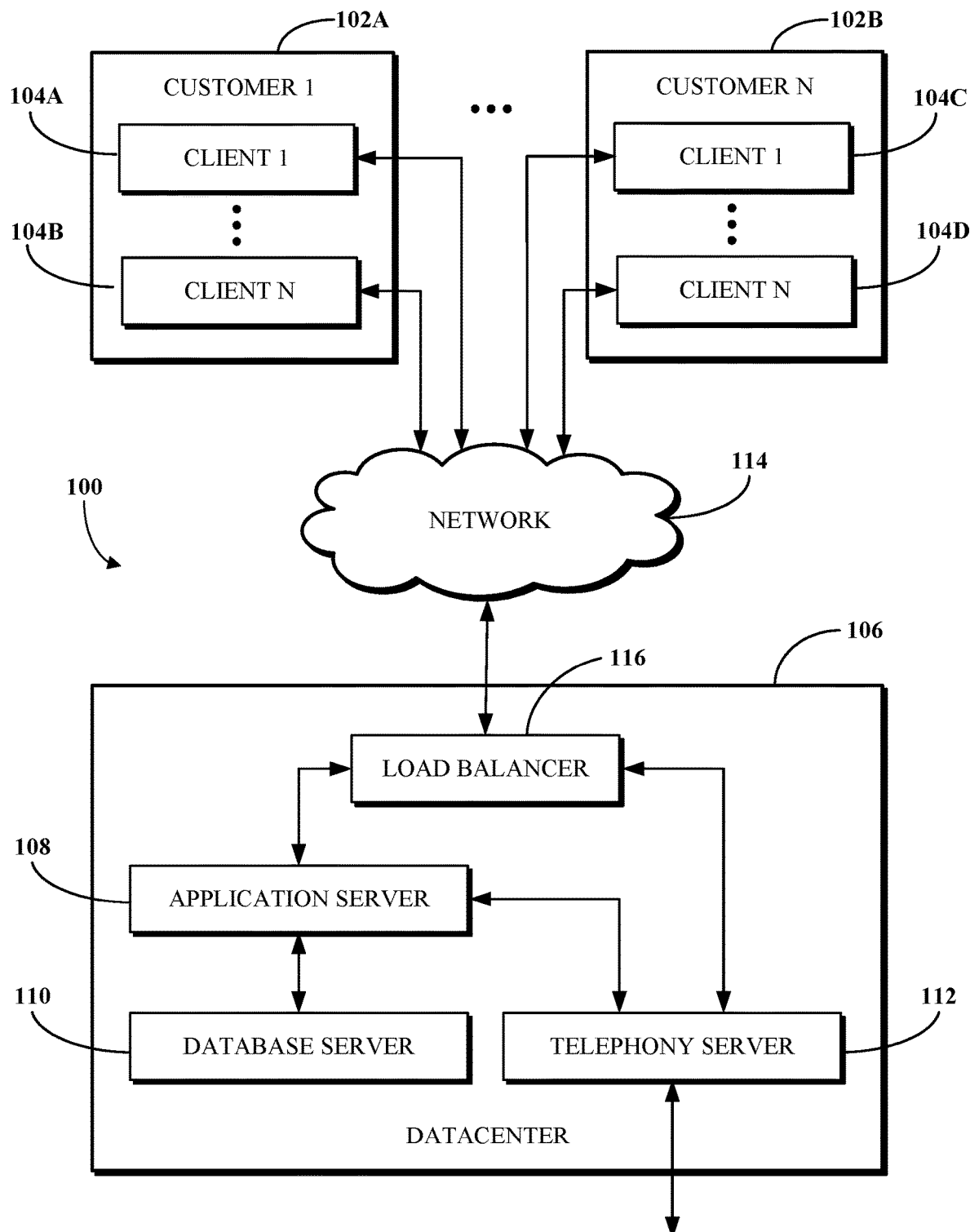
FIG. 1 is a block diagram of an example of an electronic computing and communications system.

A software platform may include multiple software applications usable for different types of interactions. For example, a UCaaS platform may include one software application for video or audio conferencing, another for email messaging, another for chat or instant messaging, and so on. The software applications may be accessed using devices in communication with the software platform. A user of the software platform may thus have multiple devices which may be usable to access one or more of those software applications. For example, the user may use some combination of a desk phone, a mobile device, and a computer, in which functionality of one or more software applications of the software platform is accessible at some combination of those devices. However, when the user starts an interaction through a software application at one device and wants to move it to another device (e.g., because the user is moving to a new location or for other reasons), limitations of a typical software platform require the user to log into the software application at the other device to restart the interaction at that other device. This process can be disruptive to the interaction, such as by delaying the interaction while the user logs back into the software application.

Typical systems are not capable of determining the proximity of devices to perform a session handover. Furthermore, typical systems cannot continue a first session at a second device because a first session at a first device cannot be moved, and therefore a second session at the second device must be initialized. Accordingly, typical systems disrupt the continuity of the session during handover from the first device to the second device.

Implementations of this disclosure address problems such as these using software for performing a proximity-based session handover of a session between devices. A session is, includes, or otherwise refers to an interaction by an operator of the device with a software application of the software platform. A session may be initiated at a first device. A second device may transmit an ultrasonic signal that is detected by the first device. In response to detecting the ultrasonic signal, the first device may transmit a request to perform a handover to continue the session in progress on the second device. The session in progress is transferred from the first device to the second device while the session remains in progress. The session in progress may be transferred using a communication channel opened between the first device and the second device. The operator may then continue the session at the second device. The session may eventually either be terminated at the second device or transferred, such as back to the first device or to a third device.

In an example, a user may initiate a phone call on their mobile device in their office. The user may decide to walk from their office to a conference room during their phone call. The conference room may include a conferencing device. The conferencing device may emit an ultrasonic signal, and when the user enters the conference room with their mobile device on a phone call. When the mobile device is within a predetermined proximity of the conferencing device, the mobile device may detect the ultrasonic signal. In response to detecting the ultrasonic signal, the phone call may be seamlessly transferred to the conferencing device such that the phone call is continued on the conferencing device without interruption.

To describe some implementations in greater detail, reference is first made to examples of hardware and software structures used to implement a system and method for performing proximity-based session handover. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOW-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOW-enabled, the telephony server 112 may initiate a SIP transaction via a VOIP gateway that transmits the SIP signal to a public switched telephone network (PSTN) system for outbound communication to the non-VOW-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
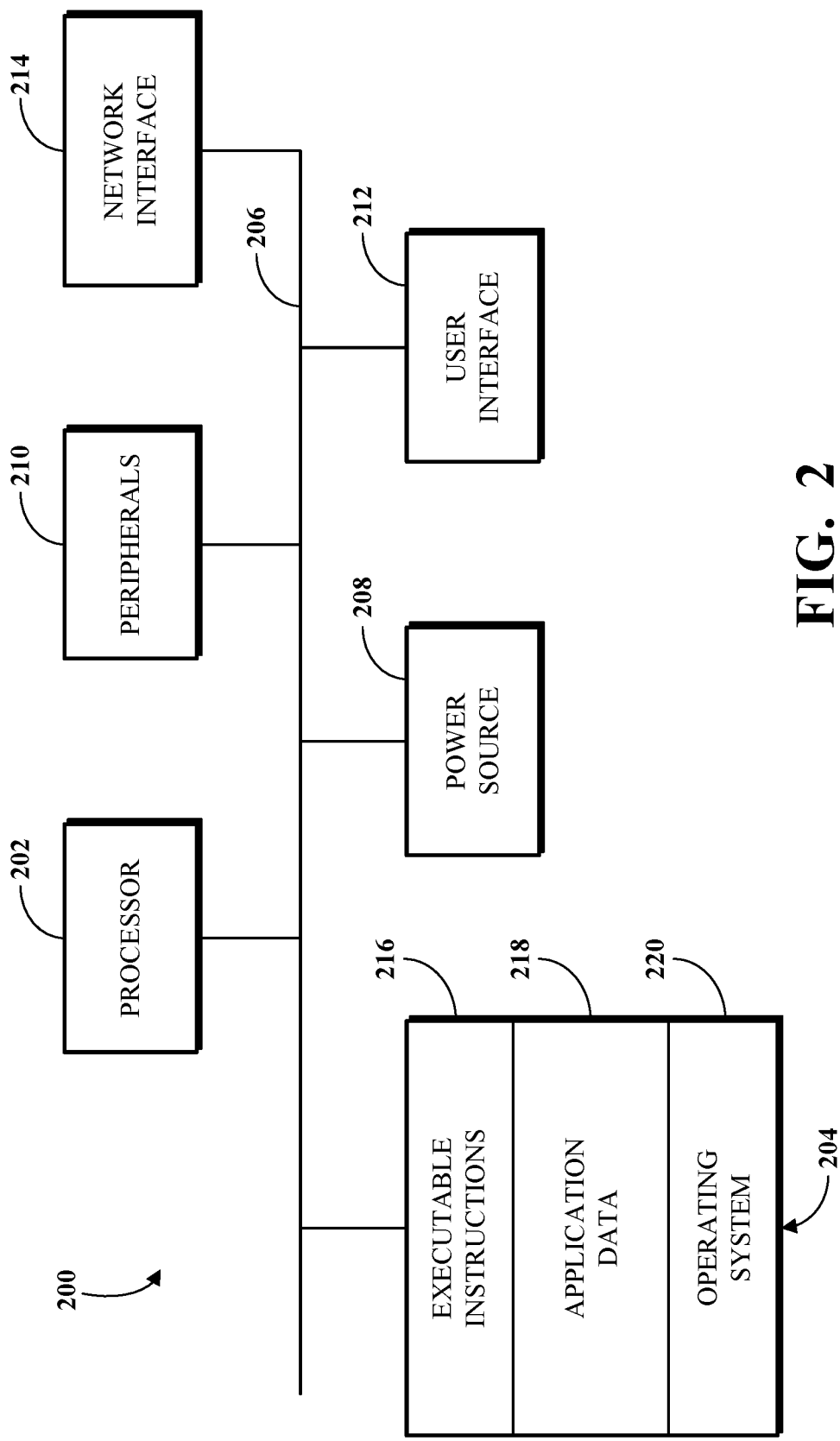
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
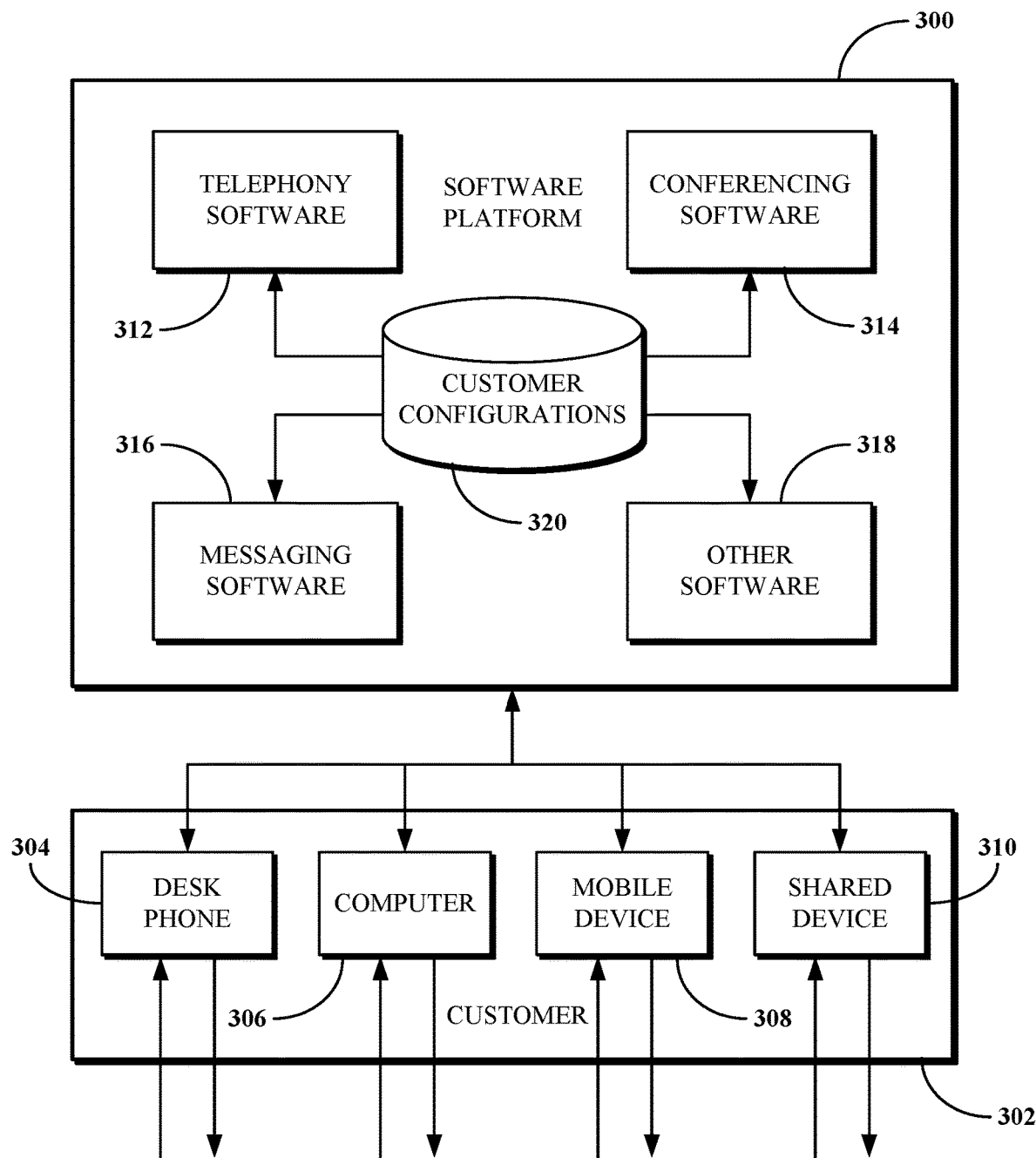
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOW-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include handover software that is configured to perform a proximity-based session handover from one client or device to another client or device. In some examples, the proximity-based session handover may be performed from one client to a non-client device.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
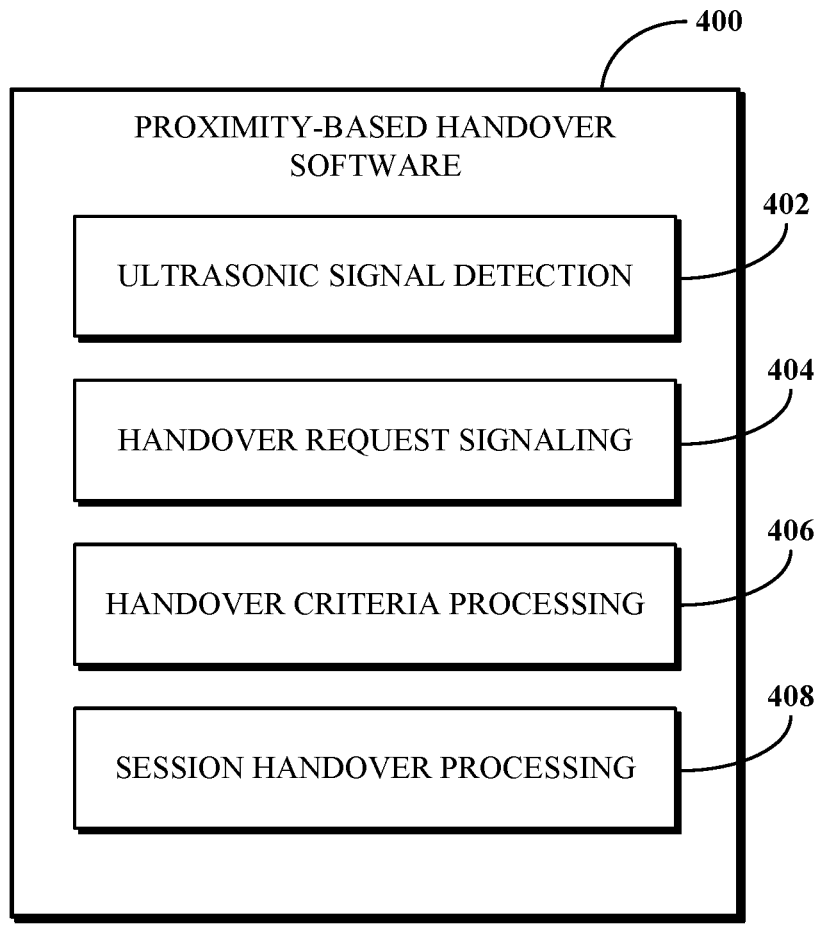
FIG. 4 is a block diagram showing example functionality of proximity-based session handover software of a software platform.

FIG. 4 is a block diagram showing example functionality of proximity-based session handover software 400 of a software platform, which may, for example, be the software platform 300 shown in FIG. 3. For example, the proximity-based session handover software 400 may be the proximity-based session handover software described above with respect to the other software 318, clients 304-310, or both. In an example, the proximity-based session handover software 400 may be associated exclusively with one or more of the clients 304-310. In another example, the proximity-based session handover software 400 may be associated with both the client and the sever in which different operations are performed at each. The proximity-based session handover software 400 includes tools for detecting an ultrasonic signal, handover request signaling, and performing a proximity-based session handover of a session in progress. As shown, the proximity-based session handover software 400 includes an ultrasonic signal detection tool 402, a handover request signaling tool 404, an interaction indication signaling tool 406, a handover criteria processing tool 408, and session handover processing tool 410.

The ultrasonic signal detection tool 402 detects an ultrasonic signal that has been transmitted from a client or device. For example, the ultrasonic signal detection tool 402 may receive an indication that a component, such as an ultrasonic receiver or a microphone of a first device, received the ultrasonic signal transmitted by a second device. In this example, the first device may be a mobile device, such as a mobile phone, a tablet computing device, or a laptop computer, and the second device may be a stationary device, such as a conferencing device configured for audio and/or visual conferencing. In this example, the first device has a session that is currently in progress. As described above, the session is, includes, or otherwise refers to an interaction by an operator of the client or device with a software application of the software platform. In particular, the interaction is one or more of a phone call, an audio conference, a video conference, a chat conversation, or another communication-based interaction. The interaction may, for example, be enabled by one or more of the software 312 through 318 shown in FIG. 3. For example, a session may be an audio or video conference implemented by the conferencing software 314 between some number of participants including the operator of the client or device. The operator may, for example, be a human user of the first device, a software intelligence unit configured to use the first device, or another entity configured for client or device operation.

The handover request signaling tool 404 signals a request to perform a handover of the session in progress from the first device to the second device, for example, via a transmitter of the first device. The request may be transmitted based on a threshold duration of time that the ultrasonic signal is detected to avoid performing an unintended handover. The request may be a request to perform a handover of the session in progress from the first device to the second device. The request may include a sharing key. The sharing key may be a secure code to associate the first device and the second device.

The handover criteria processing tool 406 determines whether to perform a handover of the session from a current client or device, that is, a client or device at which the session is currently in progress, to a different client or device, such as one of the clients or devices to which the handover request is signaled. To determine whether to handover the session, the handover criteria processing tool 406 considers one or more handover criteria, which may, for example, correspond to one or more of a detection of the ultrasonic signal associated with the second device, a verification by the operator to handover the session to the second device, or another criterion.

For example, software, which may be the proximity-based session handover software 400, the software application implementing the session, or another software aspect of the software platform, may output a graphical user interface (GUI) to a display associated with the first device to enable the operator thereof to verify the handover of the session to a selected or otherwise identified other client or device (i.e., the second device in this example). The operator of the first device may be detected within a predetermined proximity associated with the second device to which the session will be switched, for example, using an ultrasonic ranging functionality of the second device.

The session handover processing tool 408 performs a handover to switch the session in progress from one client or device to another, for example, based on the respective operations performed by the tools 402 through 406. For example, if the handover criteria processing tool 406 determines that the handover criteria is met, the session handover processing tool 408 opens a communication channel between the first device, as the device on which the session was initiated or on which the session is otherwise currently in progress, and the second device, as the device to which the session is to be switched. The communication channel is some connection usable to transmit information associated with the session over a network, for example, the network 114 shown in FIG. 1. The communication channel may be a direct connection between the first device and the second device. Alternatively, the communication channel may use the proximity-based session handover software 400 or the software platform as an intermediary.

Once the communication channel is opened, the session handover processing tool 408 causes an importing of information associated with the session from the first device to the second device, either directly or through an intermediary (e.g., the proximity-based session handover software 400 or the software platform). The imported information includes information usable by the second device to continue the session at the second device. For example, the imported information may identify a software application which implements the session, instructions for launching that software application at the second device, contents of the session, or other information.

Although the tools 402 through 408 are shown as functionality of the proximity-based session handover software 400 as a single piece of software, in some implementations, some or all of the tools 402 through 408 may exist outside of the proximity-based session handover software 400 and/ or the software platform may exclude the proximity-based session handover software 400 while still including the tools 402 through 408 elsewhere.

Figure 5:
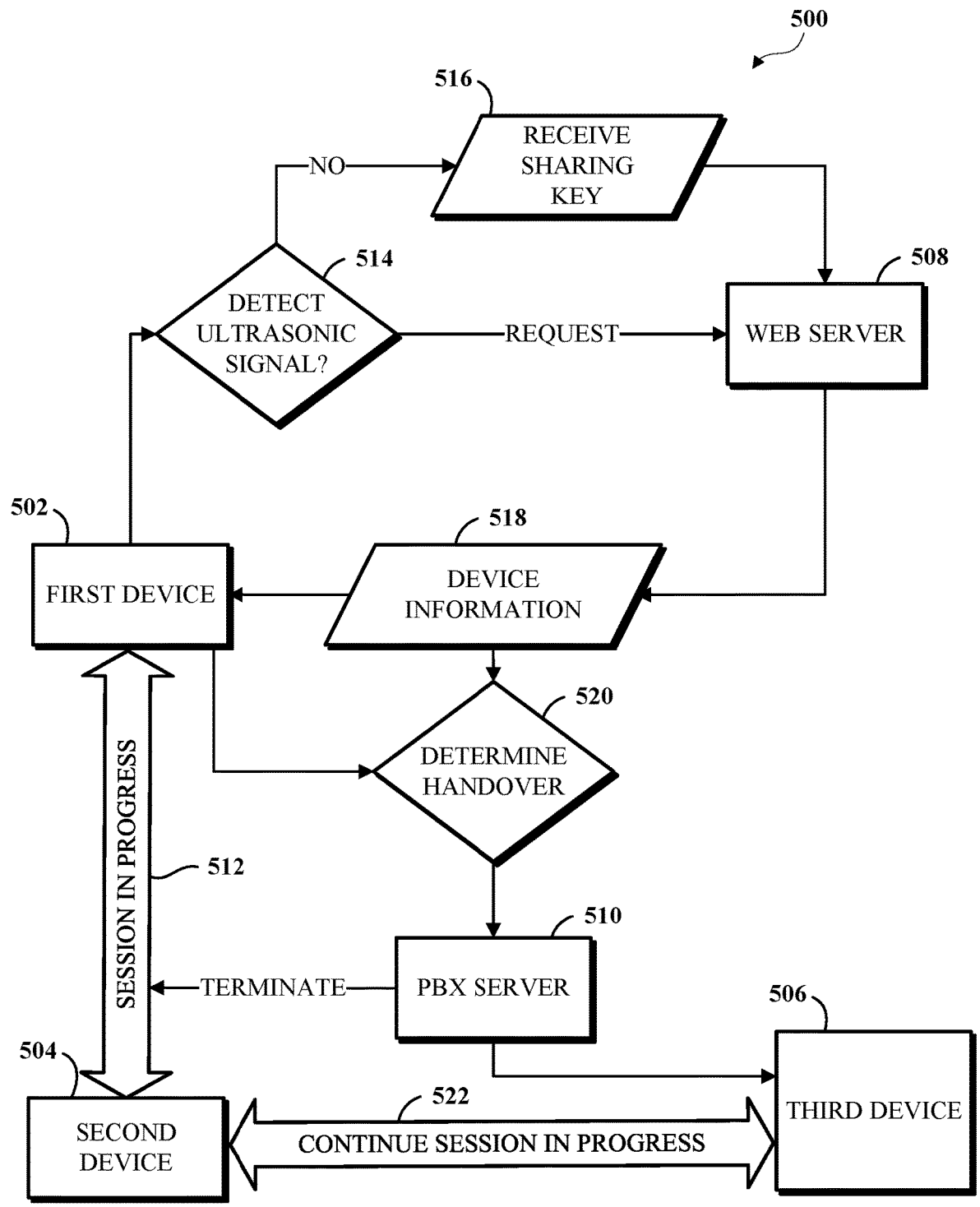
FIG. 5 is a flow diagram of an example of a system performing a proximity-based session handover.

FIG. 5 is a flow diagram of an example of a system 500 performing a proximity-based session handover. The system 500 includes a first device 502, a second device 504, a third device 506, a web server 508, and a PBX server 510. In this example, the first device 502 may be a mobile device, such as a mobile phone, a tablet computing device, a laptop computer, or another mobile device. The second device 504 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 506 may be a stationary device, such as a desk phone, a room appliance, a video conferencing system, a teleconferencing system, or another stationary device.

The first device 502 may have a session in progress 512 with the second device 504. The session in progress 512 may be an interaction such as a video or audio conference, an email messaging session, a chat or instant messaging session, or any combination thereof. In one example, the first device 502 and the second device 504 may be clients, such as any combination of clients 304 to 310 shown in FIG. 3. In another example, the first device 502 may be a client, such as one of clients 304 to 310 shown in FIG. 3, and the second device 504 may not be a client, such as a device that is calling into a conferencing service of the software platform. The user of the first device 502 may move to a location within the customer premises that contains the third device 506. The user may wish to automatically handover the session in progress 512 from the first device 502 to the third device 506 upon entering the location where the third device 506 is located.

The third device 506 may transmit a non-penetrating signal, such as an ultrasonic signal. The ultrasonic signal may be transmitted periodically at a time interval or continuously. The ultrasonic signal may be transmitted based on a detection of the first device 502. For example, the software platform may track the first device 502 using GPS to detect that the first device 502 has entered a room, such as a conference room, in which the third device 506 is located. Based on the detection that the first device 502 has entered the room, the third device 506 may transmit the ultrasonic signal. The ultrasonic signal may be a non-penetrating signal such that it does not penetrate through walls or glass and is generally contained within a room, for example, a conference room at a customer premises. The ultrasonic signal may be expressed as an encoded string that may be mapped to some device information. For example, the ultrasonic signal may include a frequency signature of the third device 506, such as, for example, a device identification (ID). The ultrasonic signal may include some encoded data that is usable to determine other information such as a device type, a device location (i.e., room name), a device model, a device address, or any combination thereof, by using a defined mapping. In some examples, the non-penetrating signal may be an infrared (IR) signal, an ultra-wideband (UWB) signal, a near-field communication (NFC) signal, or a Bluetooth signal, and may be transmitted by the third device 506 in conjunction with or instead of the ultrasonic signal.

The first device 502 may activate a component, such as, for example, an ultrasonic receiver or a microphone, based on sensor data to monitor for a non-penetrating signal, such as the ultrasonic signal. For example, sensors such as an accelerometer or a GPS may detect motion or a change in location of the first device 502 to activate the component. The motion detection may be based on a threshold, for example, to avoid activating the component based on a false positive motion such as a user checking the first device 502 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 502 and decide to move to a conference room. The first device 502 may detect that the user is in motion and activate one or more components. Upon entering the location where the third device 506 is located, the first device 502 may detect 514 the ultrasonic signal. In response to detecting the ultrasonic signal, the first device 502 may transmit a request to the web server 508.

The request may be transmitted based on a threshold duration of time that the ultrasonic signal is detected to avoid performing an unintended handover. For example, if the ultrasonic signal is detected for a duration of time that is less than the threshold duration of time, the system may determine that the user did not enter the room that the third device 506 is located. If the ultrasonic signal is detected for a duration of time that is equal to or greater than the threshold duration of time, the system may determine that the user entered the room that the third device 506 is located.

The request may be to perform a handover of the session in progress from the first device 502 to the third device 506. In some examples, the user may be prompted on the first device 502 to confirm that a handover of the session in progress 512 to the third device 506 is desired before the request is transmitted. If the first device 502 does not detect the ultrasonic signal, the first device may receive 516 a sharing key via a user input and transmit the request to the web server 508. The sharing key may be a secure code to associate the first device 502 and the third device 506.

The web server 508 may transmit device information 518 to the first device 502. The device information is associated with the third device 506 and may include a device ID, a device type, a device location (i.e., room name), a device model, a device address, or any combination thereof. The first device 502 may use the device information 518 to initiate 520 the handover by generating a handover request that includes the device information 518. Initiating the handover may include transmitting the handover request to the PBX server 510 to perform a handover of the session in progress 512 from the first device 502 to the third device 506 using the device information 518. In some examples, the first device 502 may deactivate the component after initiating the handover.

In response to receiving the handover request, the PBX server 510 may transmit information associated with the first device 502, the session in progress 512, or both, to the third device 506 to facilitate the handover. The PBX server 510 may open a communication channel between the first device 502 and the third device 506. Opening the communication channel may include mapping the frequency signature to the third device 506. The PBX server 510 may transfer the session in progress 512 from the first device 502 to the third device 506 over the communication channel such that the user may continue 522 the session in progress between the second device 504 and the third device 506 without interruption. The PBX server 510 may then transmit a termination signal to the first device 502, the second device 504, or both to terminate the session in progress 512.

Figure 6:
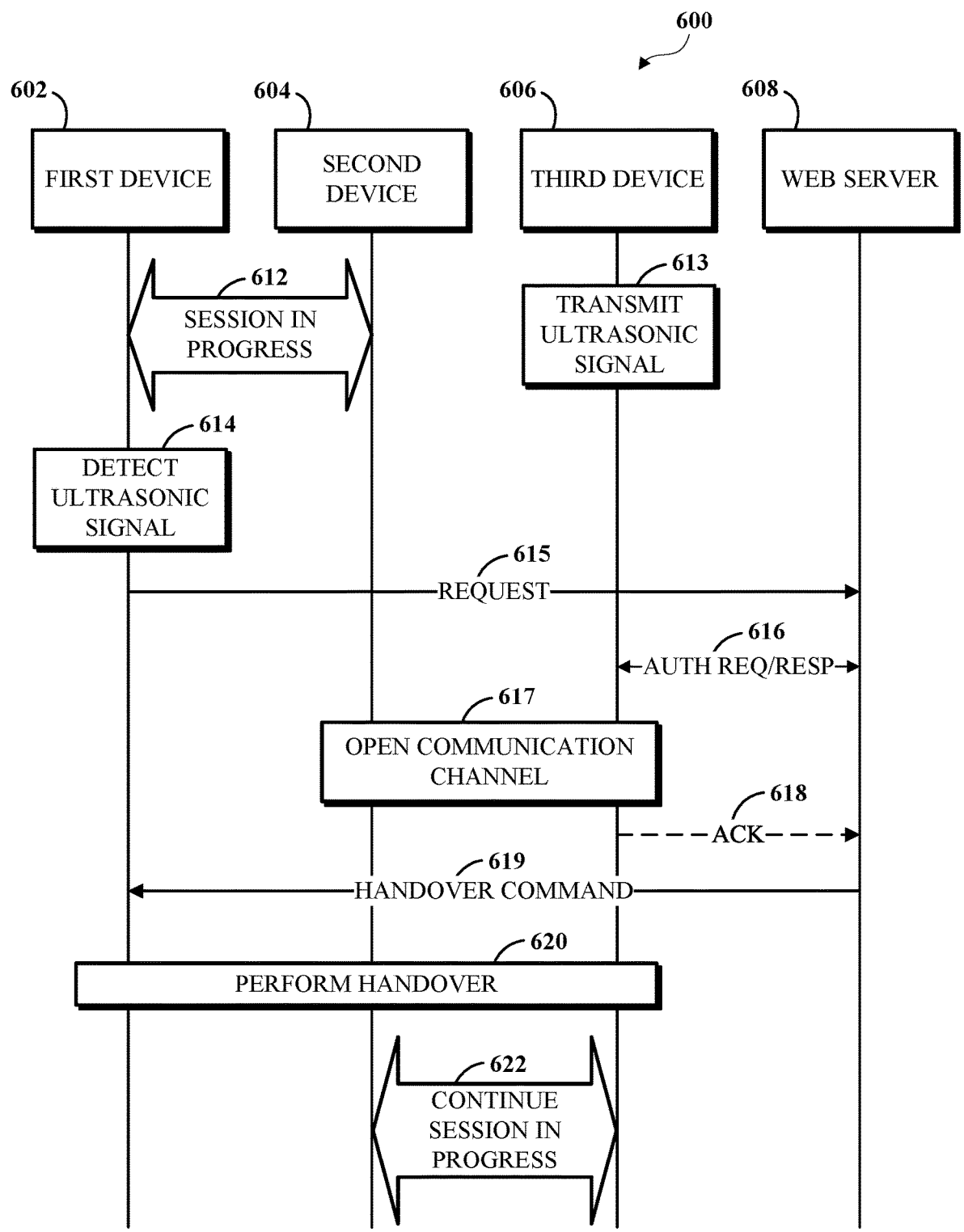
FIG. 6 is a swim lane diagram of another example of a system performing a proximity-based session handover.

FIG. 6 is a swim lane diagram of another example of a system 600 performing a proximity-based session handover. The system 600 includes a first device 602, a second device 604, a third device 606, and a web server 608. In this example, the first device 602 may be a mobile device such as a mobile phone, a tablet computing device, a laptop computer, or another mobile device. The second device 604 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 606 may be a stationary device, such as a desk phone, a room appliance, a video conferencing system, a teleconferencing system, or another stationary device.

The first device 602 may have a session in progress 612 with the second device 604. The session in progress 612 may be an interaction such as a video or audio conference, an email messaging session, a chat or instant messaging session, or any combination thereof. In one example, the first device 602 and the second device 604 may be clients, such as any combination of clients 304 to 310 shown in FIG. 3. In another example, the first device 602 may be a client, such as one of clients 304 to 310 shown in FIG. 3, and the second device 604 may not be a client, such as a device that is calling into a conferencing service of the software platform. The user of the first device 602 may move to a location within the customer premises that contains the third device 606. The user may wish to automatically handover the session in progress 612 from the first device 602 to the third device 606 upon entering the location where the third device 606 is located.

The third device 606 may transmit 613 a non-penetrating signal, such as an ultrasonic signal. The ultrasonic signal may be transmitted periodically at a time interval or continuously. The ultrasonic signal may be transmitted based on a detection of the first device 502. For example, the software platform may track the first device 502 using GPS to detect that the first device 502 has entered a room, such as a conference room, in which the third device 506 is located. Based on the detection that the first device 502 has entered the room, the third device 506 may transmit the ultrasonic signal. The ultrasonic signal may be a non-penetrating signal such that it does not penetrate through walls or glass and is generally contained within a room, for example, a conference room at a customer premises. The ultrasonic signal may be expressed as an encoded string that may be mapped to some device information. For example, the ultrasonic signal may include a frequency signature of the third device 606, such as, for example, a device ID. The ultrasonic signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or a Bluetooth signal, and may be transmitted by the third device 606 in conjunction with or instead of the ultrasonic signal.

The first device 602 may activate a component, such as, for example, an ultrasonic receiver or a microphone, based on sensor data to monitor for a non-penetrating signal, such as the ultrasonic signal. For example, sensors such as an accelerometer or a GPS may detect motion or a change in location of the first device 602 to activate the component. The motion detection may be based on a threshold, for example, to avoid activating the component based on a false positive motion such as a user checking the first device 602 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 602 and decide to move to a conference room. The first device 602 may detect that the user is in motion and activate one or more components. Upon entering the location where the third device 606 is located, the first device 602 may detect 614 the ultrasonic signal. In response to detecting the ultrasonic signal, the first device 602 may transmit a request 615 to the web server 608.

The request 615 may be transmitted based on a threshold duration of time that the ultrasonic signal is detected to avoid performing an unintended handover. For example, if the ultrasonic signal is detected for a duration of time that is less than the threshold duration of time, the system may determine that the user did not enter the room that the third device 606 is located. If the ultrasonic signal is detected for a duration of time that is equal to or greater than the threshold duration of time, the system may determine that the user entered the room that the third device 606 is located.

The request 615 may be a request to perform a handover of the session in progress 612 from the first device 602 to the third device 606. In some examples, the user may be prompted on the first device 602 to confirm that a handover of the session in progress 612 to the third device 606 is desired before the request 615 is transmitted. If the first device 602 does not detect the ultrasonic signal, the first device may receive a sharing key via a user input and transmit the request 615 to the web server 608. The sharing key may be a secure code to associate the first device 602 and the third device 606.

If the first device 602 is not pre-authorized, the web server 508 may perform an authentication with the third device 606 by transmitting/receiving an authentication request/response 616. The authentication request may include device information of the first device 602. The device information may include a device ID, a device type, a device location (i.e., room name), a device model, a device address, or any combination thereof. The third device 606 may use the device information for the handover. Upon completion of the authentication, the web server 608 may initiate the handover by opening 617 a communication channel between the second device 604 and the third device 606. Opening the communication channel may include mapping the frequency signature to the third device 606. If the first device 602 is pre-authorized, the authentication step may be eliminated, and the web server 608 may initiate the handover by opening 617 the communication channel between the second device 604 and the third device 606. In some examples, the first device 602 may deactivate the detector after initiating the handover. In some examples, the third device 606 may transmit an acknowledgement 618 to the web server 608 that indicates that the communication channel between the second device 604 and the third device 606 is open.

In this example, the web server 608 transmits a handover command 619 to the first device 602. The handover command 619 may include information associated with the third device 606, the session in progress 612, or both, to facilitate the handover. The handover is performed 620 such that the session in progress 612 is transferred from the first device 602 to the third device 606 over the communication channel such that the user may continue 622 the session in progress between the second device 604 and the third device 606 without interruption. Upon successful handover to the third device 606, the first device 602, the second device 604, or both, may terminate the session in progress 612. In some examples, the first device 602, the second device 604, or both, may transmit a termination signal based on an expiration of a timer. In some examples, the timer may be based on a duration of time where the first device 602 detects motion or not. For example, if the first device 602 is determined to remain in the room after the expiration of the timer, the termination signal may be transmitted. If the first device 602 is determined to have left the room based on detected motion prior to the expiration of the timer, the termination signal may not be transmitted so that the user may resume the session on the first device 602.

In some examples, the first device 602 may be configured to detect a sensor input during the session in progress 622 between the second device 604 and the third device 606. The sensor input may include accelerometer data or GPS data. In response to detecting the sensor input, a monitor may be initiated to detect the non-penetrating signal. If the non-penetrating signal is not detected, a handover of the session in progress 622 to the first device may be performed. The handover to the first device 602 may be performed when a duration of time of not detecting the non-penetrating signal exceeds a predetermined duration of time.

Figure 7:
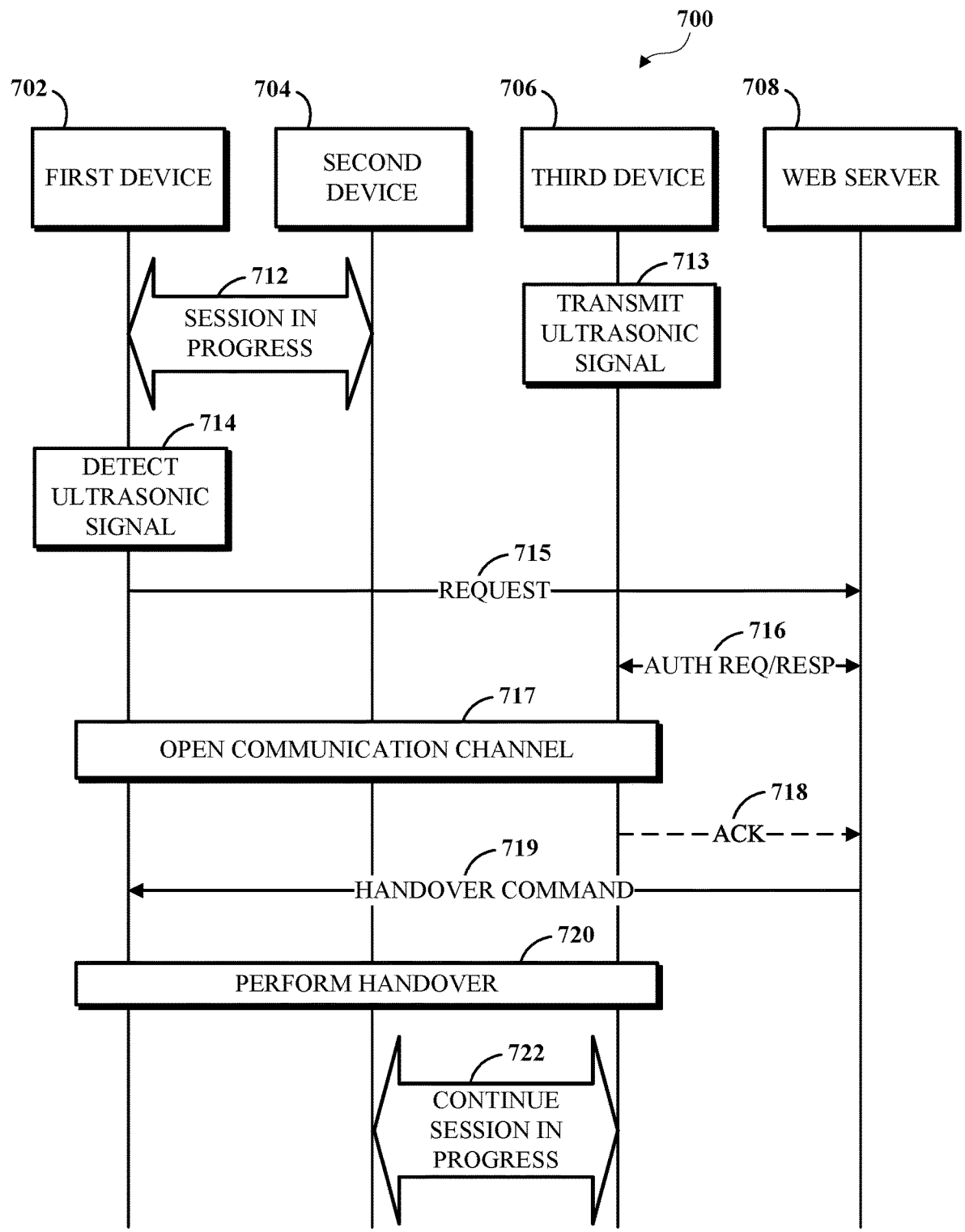
FIG. 7 is a swim lane diagram of another example of a system performing a proximity-based session handover.

FIG. 7 is a swim lane diagram of another example of a system 700 performing a proximity-based session handover. The system 700 includes a first device 702, a second device 704, a third device 706, and a web server 708. In this example, the first device 702 may be a mobile device such as a mobile phone, a tablet computing device, a laptop computer, or another mobile device. The second device 704 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 706 may be a stationary device, such as a desk phone, a room appliance, a video conferencing system, a teleconferencing system, or another mobile or stationary device.

The first device 702 may have a session in progress 712 with the second device 704. The session in progress 712 may be an interaction such as a video or audio conference, an email messaging session, a chat or instant messaging session, or any combination thereof. In one example, the first device 702 and the second device 704 may be clients, such as any combination of clients 304 to 310 shown in FIG. 3. In another example, the first device 702 may be a client, such as one of clients 304 to 310 shown in FIG. 3, and the second device 704 may not be a client, such as a device that is calling into a conferencing service of the software platform. The user of the first device 702 may move to a location within the customer premises that contains the third device 706. The user may wish to automatically handover the session in progress 712 from the first device 702 to the third device 706 upon entering the location where the third device 706 is located.

The third device 706 may transmit 713 a non-penetrating signal, such as an ultrasonic signal. The ultrasonic signal may be transmitted periodically at a time interval or continuously. The ultrasonic signal may be transmitted based on a detection of the first device 702. For example, the software platform may track the first device 702 using GPS to detect that the first device 702 has entered a room, such as a conference room, in which the third device 706 is located. Based on the detection that the first device 702 has entered the room, the third device 706 may transmit the ultrasonic signal. The ultrasonic signal may be a non-penetrating signal such that it does not penetrate through walls or glass and is generally contained within a room, for example, a conference room at a customer premises. The ultrasonic signal may be expressed as an encoded string that may be mapped to some device information. For example, the ultrasonic signal may include a frequency signature of the third device 706, such as, for example, a device ID. The ultrasonic signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or a Bluetooth signal, and may be transmitted by the third device 706 in conjunction with or instead of the ultrasonic signal.

The first device 702 may activate a component, such as, for example, an ultrasonic receiver or a microphone, based on sensor data to monitor for a non-penetrating signal, such as the ultrasonic signal. For example, sensors such as an accelerometer or a GPS may detect motion or a change in location of the first device 702 to activate the component. The motion detection may be based on a threshold, for example, to avoid activating the component based on a false positive motion such as a user checking the first device 702 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 702 and decide to move to a conference room. The first device 702 may detect that the user is in motion and activate one or more components. Upon entering the location where the third device 706 is located, the first device 702 may detect 714 the ultrasonic signal. In response to detecting the ultrasonic signal, the first device 702 may transmit a request 715 to the web server 708.

The request 715 may be transmitted based on a threshold duration of time that the ultrasonic signal is detected to avoid performing an unintended handover. For example, if the ultrasonic signal is detected for a duration of time that is less than the threshold duration of time, the system may determine that the user did not enter the room that the third device 706 is located. If the ultrasonic signal is detected for a duration of time that is equal to or greater than the threshold duration of time, the system may determine that the user entered the room that the third device 706 is located.

The request 715 may be a request to perform a handover of the session in progress 712 from the first device 702 to the third device 706. In some examples, the user may be prompted on the first device 702 to confirm that a handover of the session in progress 712 to the third device 706 is desired before the request 715 is transmitted. If the first device 702 does not detect the ultrasonic signal, the first device may receive a sharing key via a user input and transmit the request 715 to the web server 708. The sharing key may be a secure code to associate the first device 702 and the third device 706.

If the first device 702 is not pre-authorized, the web server 708 may perform an authentication with the third device 706 by transmitting/receiving an authentication request/response 716. The authentication request may include device information of the first device 702. The device information may include a device ID, a device type, a device location (i.e., room name), a device model, a device address, or any combination thereof. The third device 706 may use the device information for the handover. Upon completion of the authentication, the web server 708 may initiate the handover by opening 717 a communication channel between the first device 702, the second device 704, and the third device 706. Opening the communication channel may include mapping the frequency signature to the third device 706. If the first device 702 is pre-authorized, the authentication step may be eliminated, and the web server 708 may initiate the handover by opening 717 the communication channel between the first device 702, the second device 704, and the third device 706. In some examples, the first device 702 may deactivate the detector after initiating the handover. In some examples, the third device 706 may transmit an acknowledgement 718 to the web server 708 that indicates that the communication channel between the first device 702, the second device 704, and the third device 706 is open.

In this example, the web server 708 transmits a handover command 719 to the first device 702. The handover command 719 may include information associated with the third device 706, the session in progress 712, or both, to facilitate the handover. The handover is performed 720 such that the session in progress 712 is transferred from the first device 702 to the third device 706 over the communication channel such that the user may continue 722 the session in progress between the second device 704 and the third device 706 without interruption. Upon successful handover to the third device 706, the first device 702, the second device 704, or both, may terminate the session in progress 712. In some examples, the first device 702, the second device 704, or both, may transmit a termination signal based on an expiration of a timer. In some examples, the timer may be based on a duration of time where the first device 702 detects motion or not. For example, if the first device 702 is determined to remain in the room after the expiration of the timer, the termination signal may be transmitted. If the first device 702 is determined to have left the room based on detected motion prior to the expiration of the timer, the termination signal may not be transmitted so that the user may resume the session on the first device 702.

In some examples, the first device 702 may be configured to detect a sensor input during the session in progress 722 between the second device 604 and the third device 706. The sensor input may include accelerometer data or GPS data. In response to detecting the sensor input, a monitor may be initiated to detect the non-penetrating signal. If the non-penetrating signal is not detected, a handover of the session in progress 722 to the first device may be performed. The handover to the first device 702 may be performed when a duration of time of not detecting the non-penetrating signal exceeds a predetermined duration of time.

Figure 8:
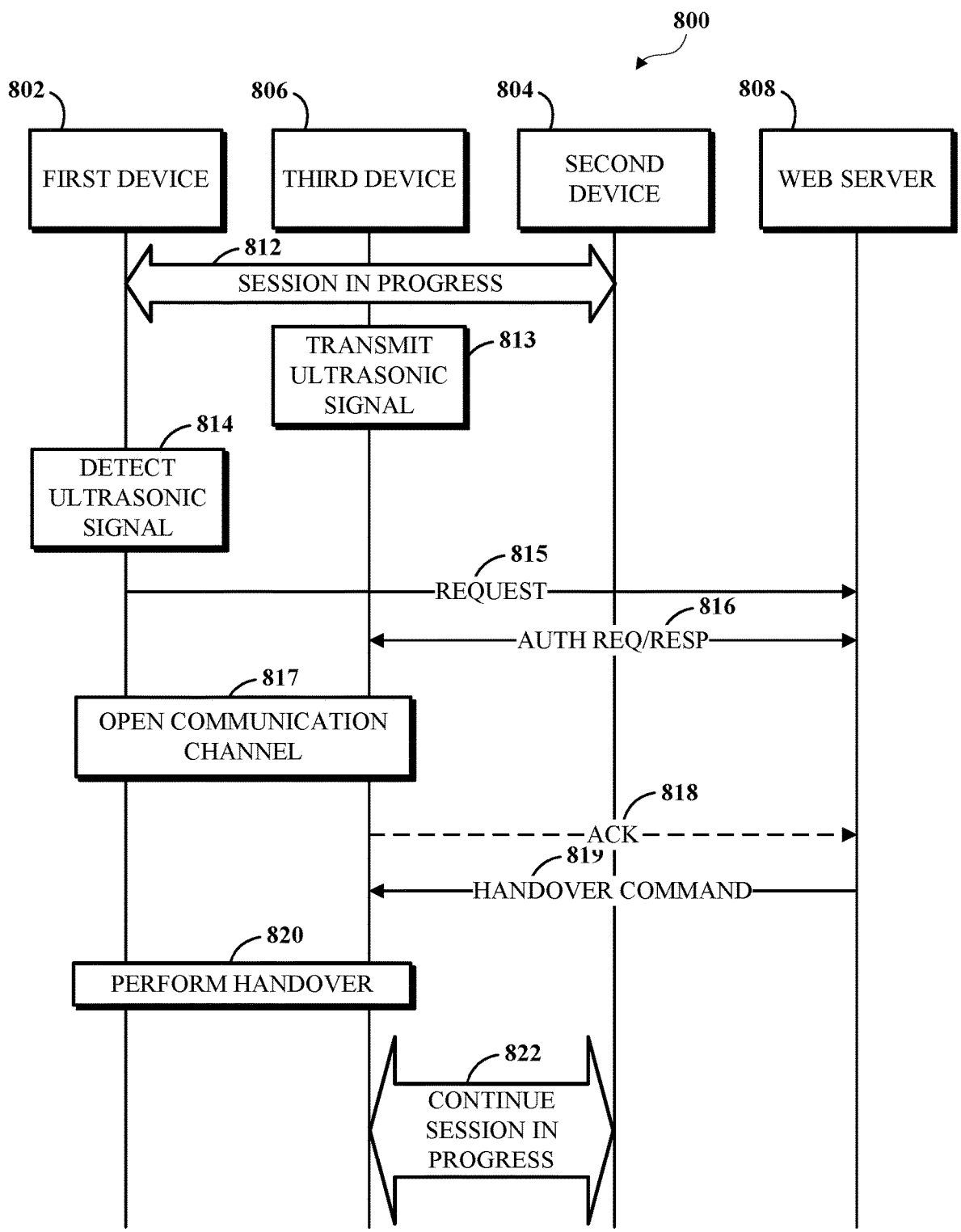
FIG. 8 is a swim lane diagram of another example of a system performing a proximity-based session handover.

FIG. 8 is a swim lane diagram of another example of a system 800 performing a proximity-based session handover. The system 800 includes a first device 802, a second device 804, a third device 806, and a web server 808. In this example, the first device 802 may be a mobile device such as a mobile phone, a tablet computing device, a laptop computer, or another mobile device. The second device 804 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 806 may be a stationary device, such as a desk phone, a room appliance, a video conferencing system, a teleconferencing system, or another mobile or stationary device.

The first device 802 may have a session in progress 812 with the second device 804. The session in progress 812 may be an interaction such as a video or audio conference, an email messaging session, a chat or instant messaging session, or any combination thereof. In one example, the first device 802 and the second device 804 may be clients, such as any combination of clients 304 to 310 shown in FIG. 3. In another example, the first device 802 may be a client, such as one of clients 304 to 310 shown in FIG. 3, and the second device 804 may not be a client, such as a device that is calling into a conferencing service of the software platform. The user of the first device 802 may move to a location within the customer premises that contains the third device 806. The user may wish to automatically handover the session in progress 812 from the first device 802 to the third device 806 upon entering the location where the third device 806 is located.

The third device 806 may transmit 813 a non-penetrating signal, such as an ultrasonic signal. The ultrasonic signal may be transmitted periodically at a time interval or continuously. The ultrasonic signal may be transmitted based on a detection of the first device 802. For example, the software platform may track the first device 802 using GPS to detect that the first device 802 has entered a room, such as a conference room, in which the third device 806 is located. Based on the detection that the first device 802 has entered the room, the third device 806 may transmit the ultrasonic signal. The ultrasonic signal may be a non-penetrating signal such that it does not penetrate through walls or glass and is generally contained within a room, for example, a conference room at a customer premises. The ultrasonic signal may be expressed as an encoded string that may be mapped to some device information. For example, the ultrasonic signal may include a frequency signature of the third device 806, such as, for example, a device ID. The ultrasonic signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or a Bluetooth signal, and may be transmitted by the third device 806 in conjunction with or instead of the ultrasonic signal.

The first device 802 may activate a component, such as, for example, an ultrasonic receiver or a microphone, based on sensor data to monitor for a non-penetrating signal, such as the ultrasonic signal. For example, sensors such as an accelerometer or a GPS may detect motion or a change in location of the first device 802 to activate the component. The motion detection may be based on a threshold, for example, to avoid activating the component based on a false positive motion such as a user checking the first device 802 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 802 and decide to move to a conference room. The first device 802 may detect that the user is in motion and activate one or more components. Upon entering the location where the third device 806 is located, the first device 802 may detect 814 the ultrasonic signal. In response to detecting the ultrasonic signal, the first device 802 may transmit a request 815 to the web server 808.

The request 815 may be transmitted based on a threshold duration of time that the ultrasonic signal is detected to avoid performing an unintended handover. For example, if the ultrasonic signal is detected for a duration of time that is less than the threshold duration of time, the system may determine that the user did not enter the room that the third device 806 is located. If the ultrasonic signal is detected for a duration of time that is equal to or greater than the threshold duration of time, the system may determine that the user entered the room that the third device 806 is located.

The request 815 may be a request to perform a handover of the session in progress 812 from the first device 802 to the third device 806. In some examples, the user may be prompted on the first device 802 to confirm that a handover of the session in progress 812 to the third device 806 is desired before the request 815 is transmitted. If the first device 802 does not detect the ultrasonic signal, the first device may receive a sharing key via a user input and transmit the request 815 to the web server 808. The sharing key may be a secure code to associate the first device 802 and the third device 806.

If the first device 802 is not pre-authorized, the web server 808 may perform an authentication with the third device 806 by transmitting/receiving an authentication request/response 816. The authentication request may include device information of the first device 802. The device information may include a device ID, a device type, a device location (i.e., room name), a device model, a device address, or any combination thereof. The third device 806 may use the device information for the handover. Upon completion of the authentication, the web server 808 may initiate the handover by opening 817 a communication channel between the first device 802 and the third device 806. Opening the communication channel may include mapping the frequency signature to the third device 806. If the first device 802 is pre-authorized, the authentication step may be eliminated, and the web server 808 may initiate the handover by opening 817 the communication channel between the first device 802 and the third device 806. In some examples, the first device 802 may deactivate the detector after initiating the handover. In some examples, the third device 806 may transmit an acknowledgement 818 to the web server 808 that indicates that the communication channel between the first device 802 and the third device 806 is open.

In this example, the web server 808 transmits a handover command 819 to the third device 806. The handover command 819 may include information associated with the first device 802, the second device 804, the session in progress 812, or any combination thereof, to facilitate the handover. The handover is performed 820 such that the session in progress 812 is transferred from the first device 802 to the third device 806 over the communication channel such that the user may continue 822 the session in progress between the second device 804 and the third device 806 without interruption. In some examples, performing 820 the handover may include opening a communication channel between the second device 804 and the third device 806, and transferring the session in progress 812 over this communication channel. Upon successful handover to the third device 806, the first device 802, the second device 804, or both, may terminate the session in progress 812. In some examples, the first device 802, the second device 804, or both, may transmit a termination signal based on an expiration of a timer. In some examples, the timer may be based on a duration of time where the first device 802 detects motion or not. For example, if the first device 802 is determined to remain in the room after the expiration of the timer, the termination signal may be transmitted. If the first device 802 is determined to have left the room based on detected motion prior to the expiration of the timer, the termination signal may not be transmitted so that the user may resume the session on the first device 802.

In some examples, the first device 802 may be configured to detect a sensor input during the session in progress 822 between the second device 804 and the third device 806. The sensor input may include accelerometer data or GPS data. In response to detecting the sensor input, a monitor may be initiated to detect the non-penetrating signal. If the non-penetrating signal is not detected, a handover of the session in progress 822 to the first device may be performed. The handover to the first device 802 may be performed when a duration of time of not detecting the non-penetrating signal exceeds a predetermined duration of time.

Figure 9:
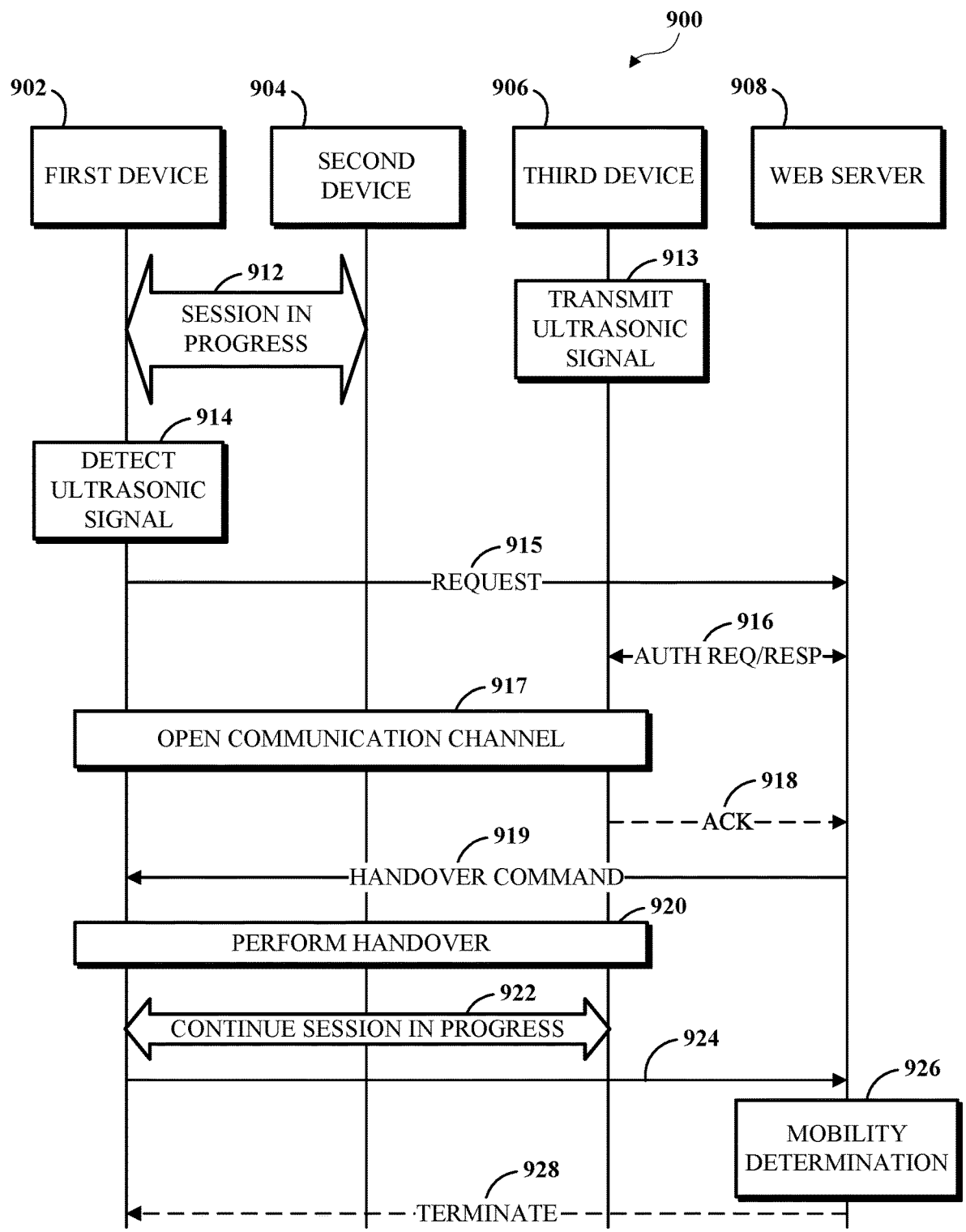
FIG. 9 is a swim lane diagram of another example of a system performing a proximity-based session handover.

FIG. 9 is a swim lane diagram of another example of a system 900 performing a proximity-based session handover. The system 900 includes a first device 902, a second device 904, a third device 906, and a web server 908. In this example, the first device 902 may be a mobile device such as a mobile phone, a tablet computing device, a laptop computer, or another mobile device. The second device 904 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 906 may be a stationary device, such as a desk phone, a room appliance, a video conferencing system, a teleconferencing system, or another mobile or stationary device.

The first device 902 may have a session in progress 912 with the second device 904. The session in progress 912 may be an interaction such as a video or audio conference, an email messaging session, a chat or instant messaging session, or any combination thereof. In one example, the first device 902 and the second device 804 may be clients, such as any combination of clients 304 to 310 shown in FIG. 3. In another example, the first device 902 may be a client, such as one of clients 304 to 310 shown in FIG. 3, and the second device 904 may not be a client, such as a device that is calling into a conferencing service of the software platform. The user of the first device 902 may move to a location within the customer premises that contains the third device 906. The user may wish to automatically handover the session in progress 912 from the first device 902 to the third device 906 upon entering the location where the third device 906 is located.

The third device 906 may transmit 913 a non-penetrating signal, such as an ultrasonic signal. The ultrasonic signal may be transmitted periodically at a time interval or continuously. The ultrasonic signal may be transmitted based on a detection of the first device 902. For example, the software platform may track the first device 902 using GPS to detect that the first device 902 has entered a room, such as a conference room, in which the third device 906 is located. Based on the detection that the first device 902 has entered the room, the third device 906 may transmit the ultrasonic signal. The ultrasonic signal may be a non-penetrating signal such that it does not penetrate through walls or glass and is generally contained within a room, for example, a conference room at a customer premises. The ultrasonic signal may be expressed as an encoded string that may be mapped to some device information. For example, the ultrasonic signal may include a frequency signature of the third device 906, such as, for example, a device ID. The ultrasonic signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or a Bluetooth signal, and may be transmitted by the third device 906 in conjunction with or instead of the ultrasonic signal.

The first device 902 may activate a component, such as, for example, an ultrasonic receiver or a microphone, based on sensor data to monitor for a non-penetrating signal, such as the ultrasonic signal. For example, sensors such as an accelerometer or a GPS may detect motion or a change in location of the first device 902 to activate the component. The motion detection may be based on a threshold, for example, to avoid activating the component based on a false positive motion such as a user checking the first device 902 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 902 and decide to move to a conference room. The first device 902 may detect that the user is in motion and activate one or more components. Upon entering the location where the third device 906 is located, the first device 902 may detect 914 the ultrasonic signal. In response to detecting the ultrasonic signal, the first device 902 may transmit a request 915 to the web server 908.

The request 915 may be transmitted based on a threshold duration of time that the ultrasonic signal is detected to avoid performing an unintended handover. For example, if the ultrasonic signal is detected for a duration of time that is less than the threshold duration of time, the system may determine that the user did not enter the room that the third device 906 is located. If the ultrasonic signal is detected for a duration of time that is equal to or greater than the threshold duration of time, the system may determine that the user entered the room that the third device 906 is located.

The request 915 may be a request to perform a handover of the session in progress 912 from the first device 902 to the third device 906. In some examples, the user may be prompted on the first device 902 to confirm that a handover of the session in progress 912 to the third device 906 is desired before the request 915 is transmitted. If the first device 902 does not detect the ultrasonic signal, the first device may receive a sharing key via a user input and transmit the request 915 to the web server 908. The sharing key may be a secure code to associate the first device 902 and the third device 906.

If the first device 902 is not pre-authorized, the web server 908 may perform an authentication with the third device 906 by transmitting/receiving an authentication request/response 916. The authentication request may include device information of the first device 902. The device information may include a device ID, a device type, a device location (i.e., room name), a device model, a device address, or any combination thereof. The third device 906 may use the device information for the handover. Upon completion of the authentication, the web server 908 may initiate the handover by opening 917 a communication channel between the first device 902, the second device 904, and the third device 906. Opening the communication channel may include mapping the frequency signature to the third device 906. If the first device 902 is pre-authorized, the authentication step may be eliminated, and the web server 908 may initiate the handover by opening 917 the communication channel between the first device 902, the second device 904, and the third device 906. In some examples, the first device 902 may deactivate the detector after initiating the handover. In some examples, the third device 906 may transmit an acknowledgement 918 to the web server 908 that indicates that the communication channel between the first device 902, the second device 904, and the third device 906 is open.

In this example, the web server 908 transmits a handover command 919 to the first device 902. The handover command 919 may include information associated with the third device 906, the session in progress 912, or both, to facilitate the handover. The handover is performed 920 such that the session in progress 912 is transferred from the first device 902 to the third device 906 over the communication channel such that the user may continue 922 the session in progress between the second device 904 and the third device 906 without interruption.

In this example, the session in progress 912 may continue after the handover of the session to the third device 906. The first device 902 may transmit sensor data 924 to the web server 908. The web server 908 may perform a mobility determination 926 based on the sensor data. The mobility determination may be based on a timer. For example, the timer may be based on a duration of time where the web server 908 determines motion or not. If the web server 908 determines that the first device 902 is no longer at the location of the third device 906, the web server 908 may terminate the session between the second device 904 and the third device 906 and continue the session between the first device 902 and the second device 904. If the web server 908 determines that the first device 902 remains at the location of the third device 906, the web server 908 may terminate the session between the first device 902 and the second device 904 and continue the session between the second device 904 and the third device 906. The session between the first device 902 and the second device 904 may be terminated by transmitting a termination signal 928 to the first device 902.

Figure 10:
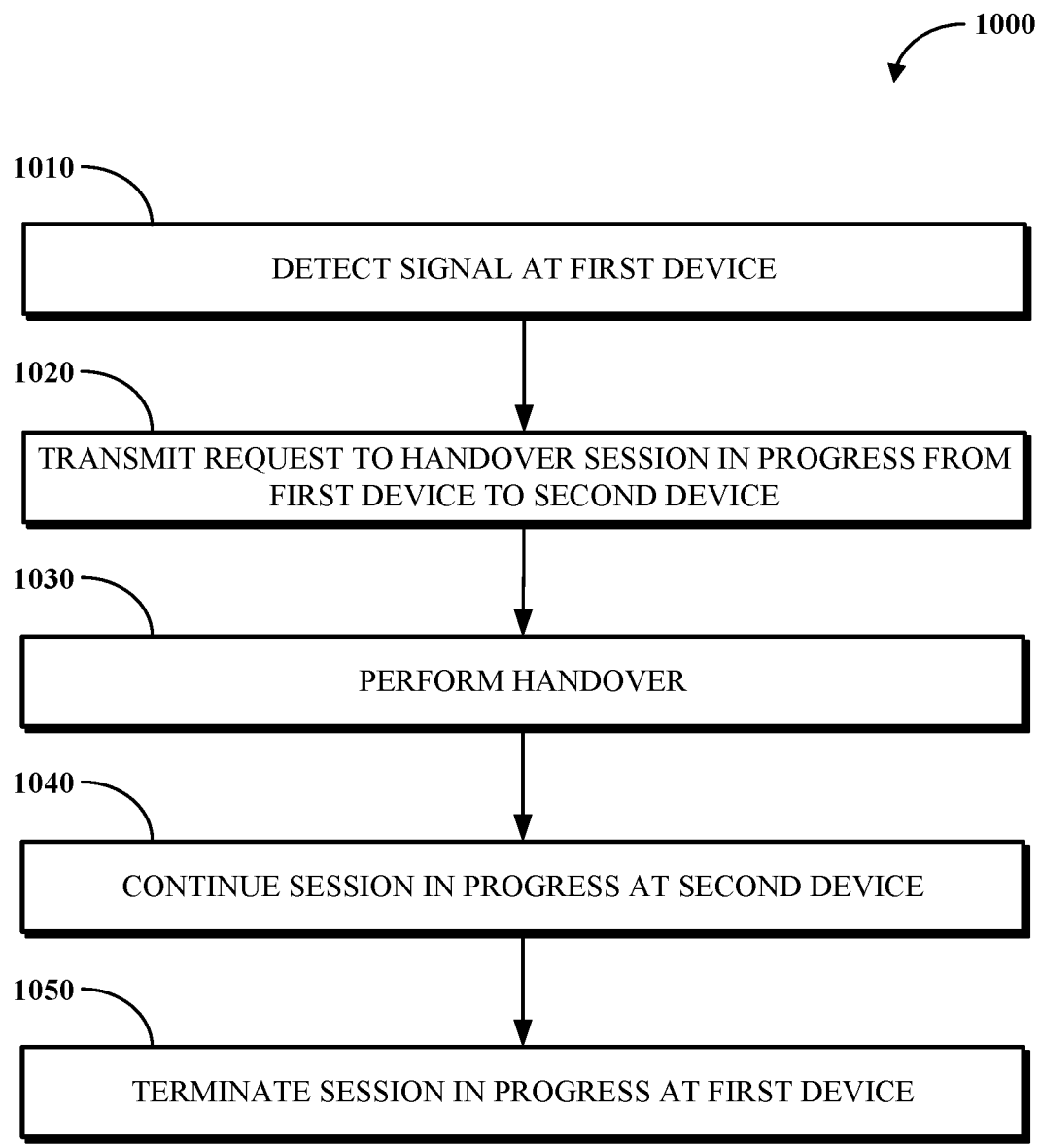
FIG. 10 is a flowchart of an example of a technique for performing a proximity-based session handover.

To further describe some implementations in greater detail, reference is next made to examples of techniques which may be performed by or using a system and method for proximity-based session handover. FIG. 10 is a flowchart of an example of a technique 1000 for performing a proximity-based session handover. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1010, the technique 1000 includes detecting a signal at a first device. The signal may be a non-penetrating signal such as an ultrasonic signal, an IR signal, a UWB signal, an NFC signal, or a Bluetooth signal. The first device may be a mobile device such as a mobile phone, a tablet computing device, or a laptop computer. The first device may have a session in progress with another device. The session in progress may be an interaction such as a video or audio conference, an email messaging session, a chat or instant messaging session, or any combination thereof. In this example, the user of the first device may move to a location on the customer premises that contains a second device. The second device may be a stationary device, such as a desk phone, a room appliance, a video conferencing system, a teleconferencing system, or the like. The second device may be configured to transmit the non-penetrating signal. The user may wish to automatically handover the session in progress from the first device to the second device upon entering the location where the second device is located.

At 1020, the technique 1000 includes transmitting a request to handover a session in progress from the first device to a second device. To avoid performing an unintended handover, the request may be transmitted based on a threshold duration of time that the non-penetrating signal is detected. For example, the system may wait to ensure that the ultrasonic signal is detected for the threshold duration of time to avoid a false positive of a device crossing into a signal range of the ultrasonic signal without the intention of a session handover. The request may include a sharing key. The sharing key may be a secure code to associate the first device and the second device. In some examples, the technique 1000 may include detecting a sensor input at the first device during the session in progress. In response to detecting the sensor input, a monitor may be activated to detect the non-penetrating signal. The handover request may be transmitted based on detecting the non-penetrating signal. In some examples, transmitting the request to handover the session in progress is based on a threshold duration of time that the non-penetrating signal is detected.

At 1030, the technique 1000 includes performing a handover. Performing the handover may include opening a communication channel. The communication channel may be opened between the first device and the second device, between the second device and the other device, or both. Opening the communication channel may include mapping a frequency signature of the non-penetrating signal to the second device. Performing the handover includes transferring the session in progress from the first device to the second device.

At 1040, the technique 1000 includes continuing the session in progress at the second device. The session in progress is continued at the second device without interruption.

At 1050, the technique 1000 includes terminating the session in progress at the first device. In some examples, the technique 1000 may include detecting a sensor input at the first device during the session in progress at the second device. In response to detecting the sensor input, a monitor may be initiated to detect the non-penetrating signal. If the non-penetrating signal is not detected, a handover of the session in progress to the first device may be performed. The handover to the first device may be performed when a duration of time of not detecting the non-penetrating signal exceeds a predetermined duration of time.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   detecting an ultrasonic signal at a mobile device, wherein the ultrasonic signal includes a frequency signature of a stationary device;
   performing a handover of a session in progress to the stationary device;
   continuing the session in progress at the stationary device; and
   terminating the session in progress at the mobile device, wherein performing the handover of the session in progress to the stationary device comprises:
      mapping the frequency signature to the stationary device to open a communication channel between the mobile device and the stationary device; and
      transferring the session in progress from the mobile device to the stationary device via the communication channel.

2. The method of claim 1, further comprising:
   transmitting a request to handover the session in progress.

3. The method of claim 1, wherein the frequency signature includes a device identification (ID) of the stationary device.

4. The method of claim 1, further comprising:
   detecting a sensor input at the mobile device during the session in progress at the stationary device;
   initiating a monitor to detect the ultrasonic signal in response to detecting the sensor input; and
   performing a handover of the session in progress to the mobile device in response to the absence of detecting the ultrasonic signal.

5. The method of claim 1, further comprising:
   detecting a sensor input at the mobile device during the session in progress at the stationary device;
   initiating a monitor to detect the ultrasonic signal in response to detecting the sensor input; and
   performing a handover of the session in progress to the mobile device in response to the absence of detecting the ultrasonic signal, wherein the handover of the session in progress to the mobile device is performed when the absence of detecting the ultrasonic signal exceeds a predetermined duration of time.

6. The method of claim 1, further comprising:
   detecting a sensor input at the mobile device during the session in progress;
   initiating a monitor to detect the ultrasonic signal in response to detecting the sensor input; and
   performing the handover of the session in progress to the stationary device in response to detecting the ultrasonic signal.

7. The method of claim 1, further comprising:
   detecting a sensor input at the mobile device during the session in progress;
   initiating a monitor to detect the ultrasonic signal in response to detecting the sensor input; and
   performing the handover of the session in progress to the stationary device in response to detecting the ultrasonic signal, wherein performing the handover of the session in progress includes transmitting a request to handover the session in progress from the mobile device to the stationary device is based on a threshold duration of time that the ultrasonic signal is detected.

8. The method of claim 1, wherein the ultrasonic signal is a non-penetrating signal.

9. The method of claim 1, wherein the stationary device is associated with a room of a customer premises.

10. A system comprising:
    a stationary device configured to transmit an ultrasonic signal;
    a mobile device configured to:
       detect the ultrasonic signal, wherein the ultrasonic signal includes a frequency signature of a stationary device;
       perform a handover of the session in progress to the stationary device, wherein the stationary device is further configured to continue the session in progress; and
       terminate the session in progress at the mobile device; and a web server configured to:
       map the frequency signature to the stationary device to open a communication channel between the mobile device and the stationary device; and
       transfer the session in progress from the mobile device to the stationary device via the communication channel.

11. The system of claim 10, wherein the mobile device is further configured to:
    transmit a request to handover the session in progress to the stationary device.

12. The system of claim 10, wherein the is an encoded string.

13. The system of claim 10, wherein the mobile device is further configured to:
    detect a sensor input during the session in progress at the stationary device; and
    monitor for the ultrasonic signal in response to the detected sensor input.

14. The system of claim 10, wherein the mobile device is further configured to:
    detect a sensor input during the session in progress at the stationary device; and
    monitor for the ultrasonic signal in response to the detected sensor input, and wherein the web server is configured to perform the handover of the session in progress to the mobile device when the ultrasonic signal is not detected.

15. The system of claim 10, wherein the handover of the session in progress to the mobile device is performed when a duration of time that the ultrasonic signal is not detected exceeds a predetermined duration of time.

16. The system of claim 10, wherein the ultrasonic signal is a non-penetrating signal, an infrared (IR) signal, an ultra-wideband (UWB) signal, a near-field communications (NFC) signal, or a Bluetooth signal.

17. A mobile device comprising:
    a component configured to detect an ultrasonic signal, wherein the ultrasonic signal includes a frequency signature of a stationary device;
    a transmitter configured to transmit a request to handover a session in progress from the mobile device to the stationary device; and
    a processor configured to:
       map the frequency signature to the stationary device to open a communication channel between the mobile device and the stationary device and transfer the session in progress to the stationary device to continue the session in progress at the stationary device; and
       terminate the session in progress at the mobile device.

18. The mobile device of claim 17, wherein the mobile device further comprises:
    a sensor configured to detect an input during the session in progress;

wherein the component is configured to monitor for the ultrasonic signal in response to detecting the input; and wherein the processor is configured to perform the handover of the session in progress to the stationary device based on the detected ultrasonic signal.

19. The mobile device of claim 17, wherein the mobile device further comprises:

a sensor configured to detect an input during the session in progress;

wherein the component is configured to monitor for the ultrasonic signal in response to detecting the input, wherein the processor is configured to perform the handover of the session in progress to the stationary device based on the detected ultrasonic signal, and wherein the transmitter is configured to transmit the request to handover the session in progress from the mobile device to the stationary device based on a threshold duration of time that the ultrasonic signal is detected.

20. The mobile device of claim 17, wherein the ultrasonic signal is a non-penetrating signal.

* * * * *